United States Patent
Mian et al.

(10) Patent No.: US 10,597,053 B2
(45) Date of Patent: Mar. 24, 2020

(54) OPERATIONS MONITORING IN AN AREA

(71) Applicant: International Electronic Machines Corporation, Troy, NY (US)

(72) Inventors: Zahid F. Mian, Loudonville, NY (US); Ronald W. Gamache, East Greenbush, NY (US)

(73) Assignee: International Electronic Machines Corp., Troy, NY (US)

( * ) Notice: Subject to any disclaimer, the term of this patent is extended or adjusted under 35 U.S.C. 154(b) by 575 days.

(21) Appl. No.: 14/272,816

(22) Filed: May 8, 2014

(65) Prior Publication Data
US 2014/0333771 A1 Nov. 13, 2014

Related U.S. Application Data

(60) Provisional application No. 61/855,074, filed on May 8, 2013.

(51) Int. Cl.
*H04N 7/18* (2006.01)
*B61L 23/00* (2006.01)
(Continued)

(52) U.S. Cl.
CPC .............. *B61L 23/00* (2013.01); *B61L 17/00* (2013.01); *B61L 17/02* (2013.01); *B61L 23/041* (2013.01);
(Continued)

(58) Field of Classification Search
CPC ...................... H04N 7/181; G06T 2207/10048
(Continued)

(56) References Cited

U.S. PATENT DOCUMENTS 7,355,508 B2    4/2008   Mian et al.
8,188,430 B2    5/2012   Mian
(Continued)

FOREIGN PATENT DOCUMENTS

JP         2009134488 A    6/2009
KR    1020130016383 A    2/2013
(Continued)

OTHER PUBLICATIONS

KR20130034528A Machine Translation.*
(Continued)

*Primary Examiner* — Nguyen T Truong
(74) *Attorney, Agent, or Firm* — LaBatt, LLC

(57) ABSTRACT

A solution for monitoring an area including one or more restricted zones is provided. The solution can include one or more monitoring assemblies deployed to acquire image data of the area and independently monitor operations within the area at each monitoring assembly. A monitoring assembly can include one or more local alert components to generate an audible or visual alarm to local personnel. Data regarding static features present in the area can be used to create a registration map of the field of view, which can subsequently enable accurate determination of the three-dimensional location of a target using two-dimensional image data and/or identify an extent of a restricted zone even when one or more of the static features are obscured. Monitoring a target over a series of images can be used to determine whether an alert condition is present.

21 Claims, 10 Drawing Sheets

(51) Int. Cl.
  *B61L 17/00* (2006.01)
  *B61L 23/04* (2006.01)
  *B61L 17/02* (2006.01)
  *B61L 27/00* (2006.01)
  *G06K 9/00* (2006.01)
  *G06T 7/55* (2017.01)

(52) U.S. Cl.
  CPC ...... *B61L 27/0077* (2013.01); *G06K 9/00785* (2013.01); *G06T 7/55* (2017.01); *H04N 7/181* (2013.01); *G06T 2207/10021* (2013.01); *G06T 2207/10048* (2013.01); *G06T 2207/30232* (2013.01); *G06T 2207/30236* (2013.01)

(58) Field of Classification Search
  USPC ......................................................... 348/149
  See application file for complete search history.

(56) References Cited

U.S. PATENT DOCUMENTS

| | | | |
|---|---|---|---|
| 8,335,606 B2 | 12/2012 | Mian et al. | |
| 8,601,494 B2 | 12/2013 | Brown et al. | |
| 8,614,744 B2 | 12/2013 | Brown et al. | |
| 8,687,065 B2 | 4/2014 | Connell | |
| 2007/0040070 A1 | 2/2007 | Stevenson et al. | |
| 2009/0289187 A1* | 11/2009 | Mian | G01S 17/89 250/330 |
| 2010/0100275 A1* | 4/2010 | Mian | G01M 17/013 701/31.4 |
| 2013/0088601 A1* | 4/2013 | Connell, II | G06K 9/00771 348/159 |

FOREIGN PATENT DOCUMENTS

| | | |
|---|---|---|
| KR | 1020130034528 A | 4/2013 |
| WO | 02055362 A1 | 7/2002 |

OTHER PUBLICATIONS

KR20130016383A Machine Translation.*
Takahiro et al., "Real-Time Gesture Recognition Using Maskable Template Model", 1996, IEEE.*
Kang, International Search Report for PCT Application No. PCT/US2014/037279, dated Sep. 26, 2014, 13 pages.
ImageSensing Sytems, Improving the free flow of the road network with ALPR, 2013, 4 pages.

* cited by examiner

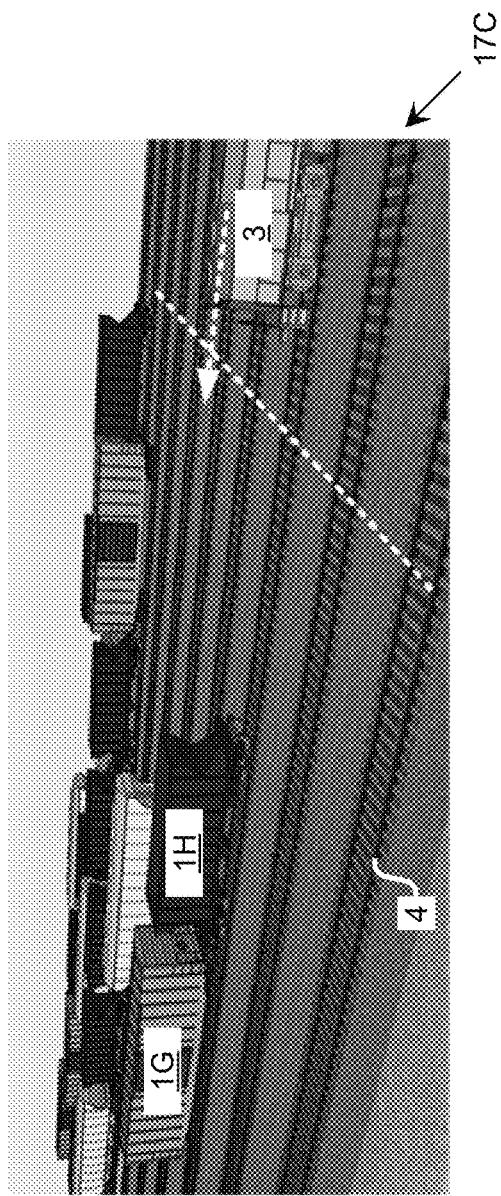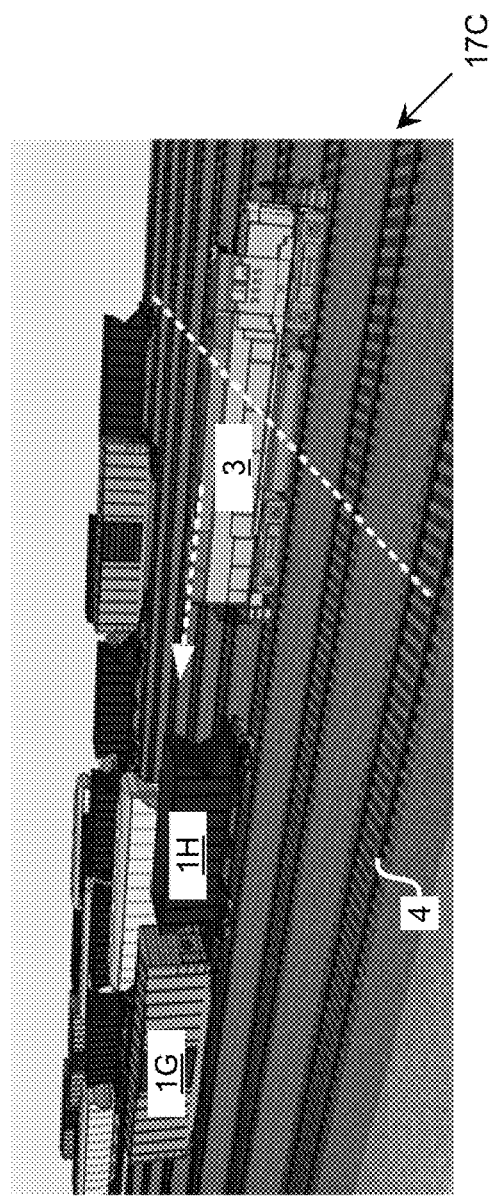

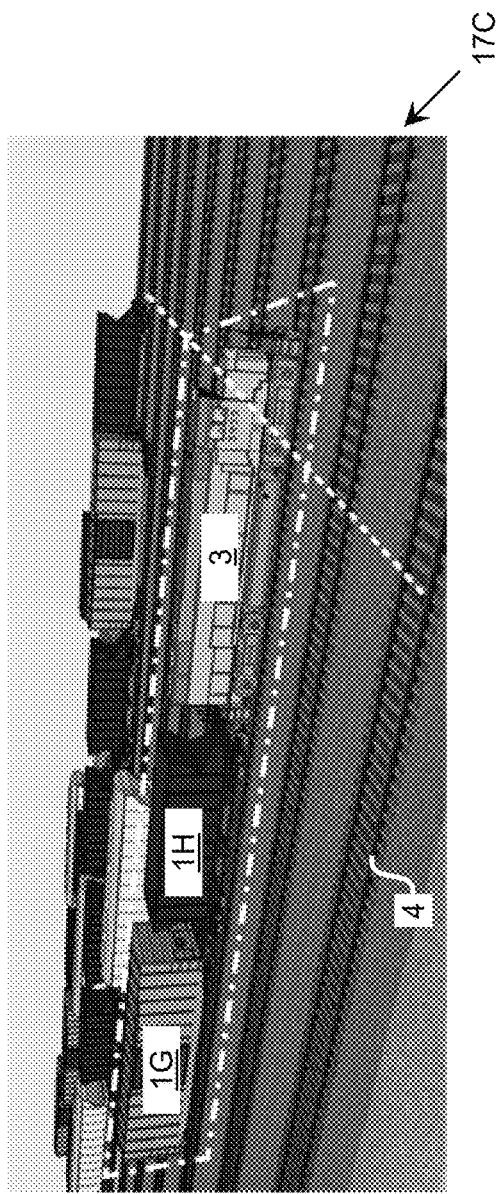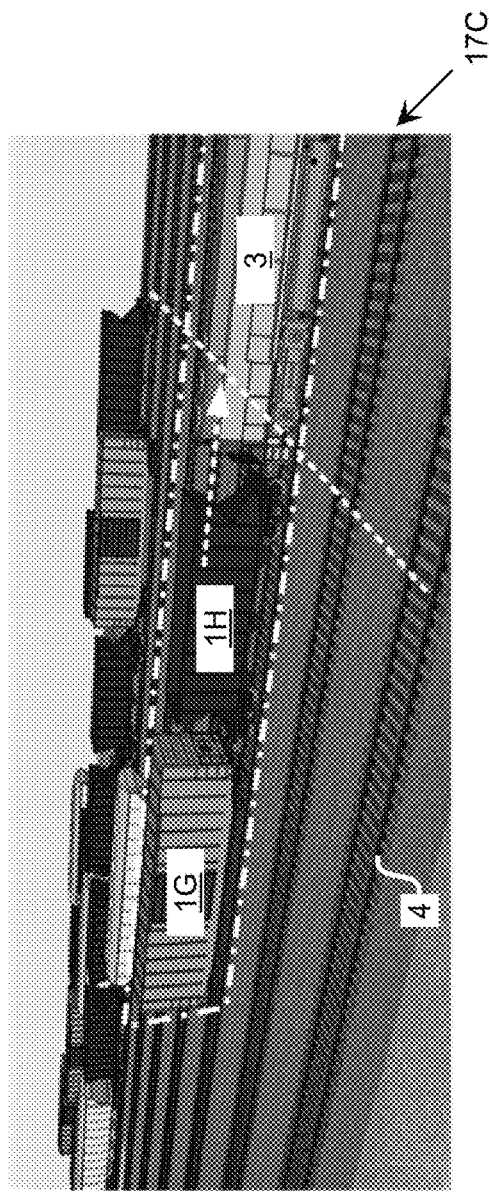

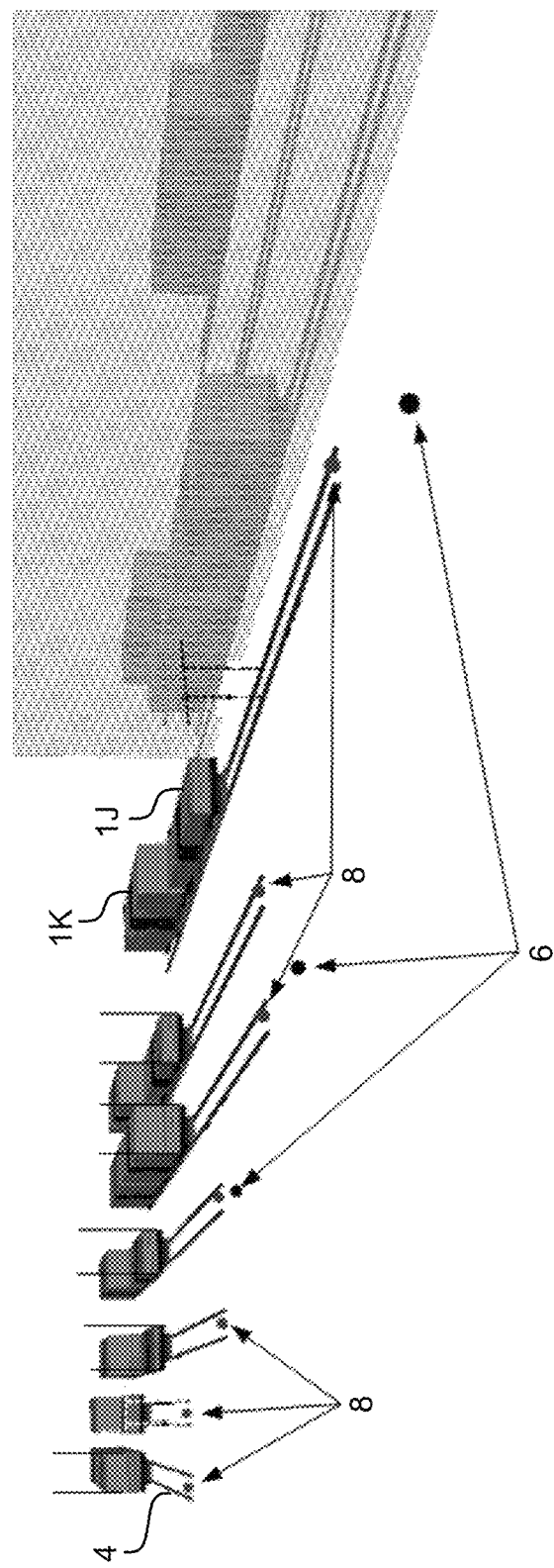

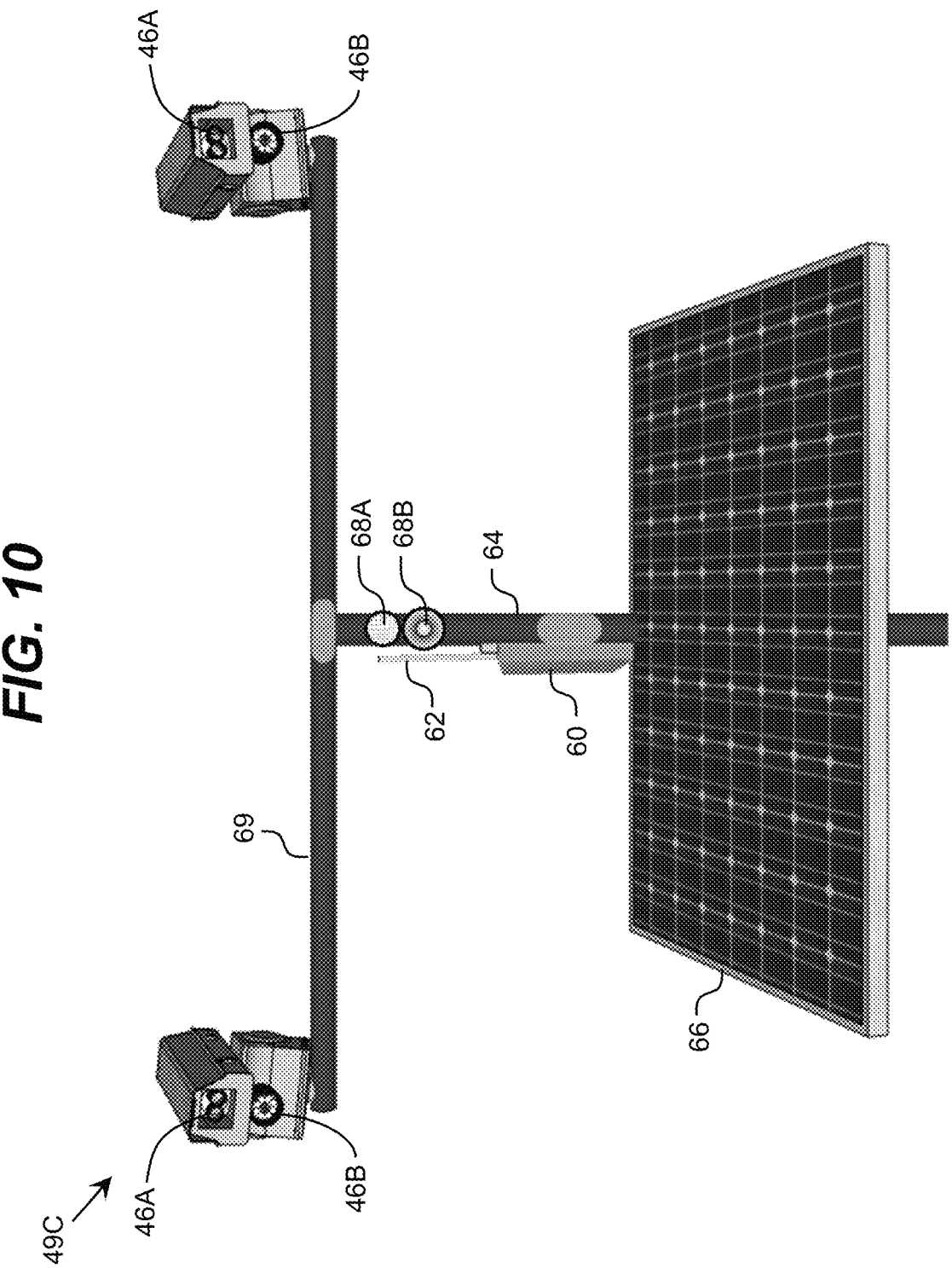

OPERATIONS MONITORING IN AN AREA

REFERENCE TO RELATED APPLICATIONS

The current application claims the benefit of U.S. Provisional Application No. 61/855,074, titled "Smart area operations monitor," which was filed on 8 May 2013, and which is hereby incorporated by reference.

TECHNICAL FIELD

The disclosure relates generally to monitoring operations in an area, and more particularly, to monitoring vehicle movements in an area.

BACKGROUND ART

It is often desirable to monitor operations over a large area, such as a railroad yard, an airport, an industrial loading area, and/or the like, where mistakes or failures during the operations can lead to serious consequences. Current approaches for monitoring operations in such areas utilize one of two basic approaches. By far the most common, which is currently in use in most rail settings, airports, and similar locations, uses human "spotters." A spotter is a person whose sole or partial function is to observe the operations of the area and recognize abnormal or dangerous situations. While, in theory, this is the best possible solution—given the capability of human beings to recognize patterns, analyze scenes, and so on—in practice it is well known that human-based monitoring has several major limitations.

These limitations include physical limitations of human perception, based on illumination and contrast, which make, for example, a rail yard at night extremely difficult to fully perceive (glaring lights, shadowed areas, etc.) and can thus lead to a failure of the observer to actually see the problem event or object. To this extent, physical failures, such as the loss of an illuminating light, can drastically reduce the capability of any human being to operate in these conditions, and other lights (for instance, powerful headlights) can cause glare that blinds human observers to any objects in the vicinity. Additionally, human beings involved in an observation-based task, which involves a lot of routine and very infrequent situations of interest, are also well-known to lose their perceptual edge and fail to be actually as attentive as they should be, thus missing key events. In addition, urgency, excitement, boredom, or other psychological factors can lead a human observer to directly misperceive an event, deciding that something is perfectly normal when in fact it is not.

A few prior art approaches have been developed to observe generally more limited areas. For example, the Autoscope system, offered by ImageSensing Systems, Inc., is designed for monitoring roadway operations. While these units are generally supplied with basic levels of computation and image processing (thresholding, blob detection, etc.) the units are limited to single spectrum operation, do not make decisions themselves, and in fact pass all data from the monitoring units in the area to a single central processor which does all of the complex work of scene understanding and makes any key decisions on alerts or actions to be taken. Autoscope, and similar systems, base decisions on individual images. Moreover, the systems as designed are inadequate for monitoring larger areas and rely purely on a fairly simple geometry to work; they do not actually understand the three-dimensional geometry that is inherent to a complex scene.

SUMMARY OF THE INVENTION

The inventors recognize several limitations in previous approaches for monitoring operations over a large area, such as a railroad yard, an airport, an industrial loading area, or other locations in which mistakes or failures during the operations can lead to serious consequences. To this extent, the inventors provide a solution, which overcomes one or more of the limitations of these previous approaches and/or one or more limitations not described herein.

Aspects of the invention provide a solution for monitoring an area including one or more restricted zones. The solution can include one or more monitoring assemblies deployed to acquire image data of the area and independently monitor operations within the area at each monitoring assembly. A monitoring assembly can include one or more local alert components to generate an audible or visual alarm to local personnel. Data regarding static features present in the area can be used to create a registration map of the field of view, which can subsequently enable accurate determination of the three-dimensional location of a target using two-dimensional image data and/or identify an extent of a restricted zone even when one or more of the static features are obscured. Monitoring a target over a series of images can be used to determine whether an alert condition is present.

A first aspect of the invention provides a classification yard comprising: a plurality of classification tracks having a first side from which rail vehicles enter for assembly in a consist and a second side from which consists exit the plurality of classification tracks, wherein each classification track includes a foul region defined by a mechanism located between the first and second sides for halting movement of a rail vehicle and a switch for merging the classification track with another classification track on the second side; a monitoring assembly including: a set of cameras, each camera having a field of view that includes the mechanism and the switch for each of the plurality of classification tracks; and a computer system configured to monitor the foul region of each of the plurality of classification tracks by performing a method including: determining a location of a rail vehicle at least partially visible in image data acquired by the set of cameras using data corresponding to a plurality of static features present in the classification yard; evaluating the location with respect to the foul region for a classification track on which the rail vehicle is located; and in response to the evaluating indicating the rail vehicle is at least partially located within the foul region, determining a presence of an alert condition using a series of images including the rail vehicle.

A second aspect of the invention provides a system comprising: a monitoring assembly including: a set of cameras, wherein the set of cameras includes at least one near infrared camera; a set of local alert components; and a computer system configured to monitor operations in a region by performing a method including: determining a location of a target at least partially visible in image data acquired by the set of cameras using data corresponding to a plurality of static features present in the region; evaluating the location with respect to at least one restricted zone in the region; in response to the evaluating indicating the target is at least partially located within a restricted zone, determining a presence of an alert condition using a series of images including the target; and activating at least one of the set of local alert components in response to determining the presence of an alert condition.

A third aspect of the invention provides a method comprising: at each of a plurality of monitoring assemblies located within an area: acquiring image data for a region of the area using a set of cameras of the monitoring assembly; processing the image data using a computer system of the monitoring assembly to determine a location of each of a set of targets at least partially visible in the image data; the computer system evaluating the location with respect to at least one restricted zone in the region; in response to the evaluating indicating the target is at least partially located within a restricted zone, the computer system determining a presence of an alert condition using a series of images including the target; and the computer system activating at least one of the set of local alert components in response to determining the presence of an alert condition.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 8A-8D show an illustrative series of hypothetical images of a monitored classification yard according to an embodiment.

FIG. 9 shows an alternative viewpoint for monitoring a classification yard according to an embodiment.

FIG. 10 shows an illustrative monitoring assembly according to another embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Embodiments of the invention can provide one or more improvements over prior art approaches for monitoring areas. Illustrative improvements include, for example, using ambient features of a monitored area to determine three-dimensional distance from two-dimensional image data; use of multispectral data fusion to disambiguate an alert situation from normal operations; use of near-infrared image data with selective filtering to increase contrast in bad weather and eliminate interference from sunlight, fixed background lights, moving headlights, and the like; situation analysis based on analysis of a series of images (e.g., blob tracking); autonomous smart camera assemblies which can be capable of independent operations as well as networked communications; and/or the like.

As indicated above, aspects of the invention provide a solution for monitoring an area including one or more restricted zones. The solution can include one or more monitoring assemblies deployed to acquire image data of the area and independently monitor operations within the area at each monitoring assembly. A monitoring assembly can include one or more local alert components to generate an audible or visual alarm to local personnel. Data regarding static features present in the area can be used to create a registration map of the field of view, which can subsequently enable accurate determination of the three-dimensional location of a target using two-dimensional image data and/or identify an extent of a restricted zone even when one or more of the static features are obscured. Monitoring a target over a series of images can be used to determine whether an alert condition is present. As used herein, unless otherwise noted, the term "set" means one or more (i.e., at least one) and the phrase "any solution" means any now known or later developed solution.

Figure 1:
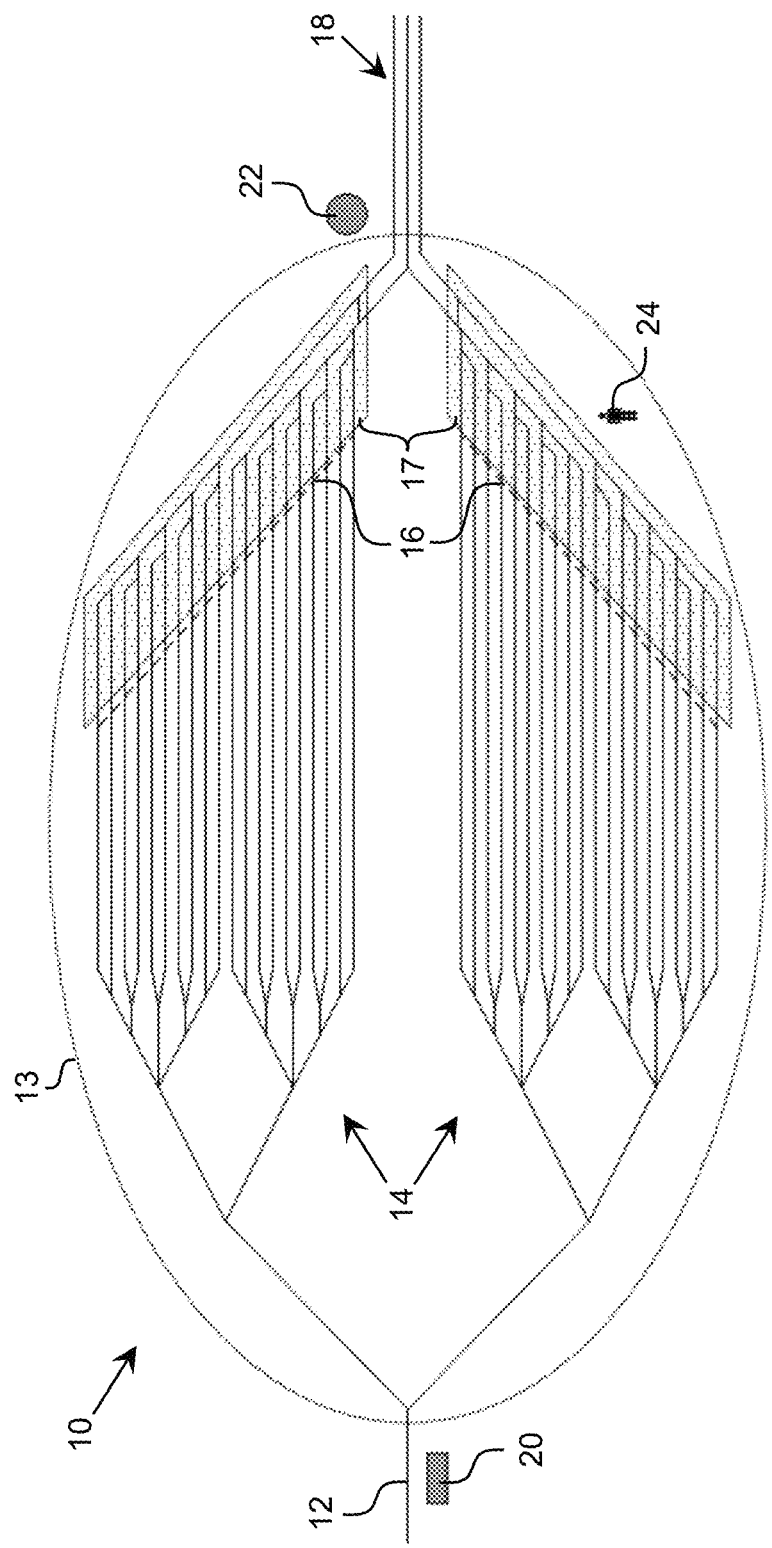
FIG. 1 shows a simplified diagram of an illustrative classification yard according to an embodiment.

Further aspects of the invention are described herein using a railroad classification yard as an illustrative area within which operations are monitored. To this extent, FIG. 1 shows a simplified diagram of an illustrative classification yard 10 according to an embodiment. The classification yard 10 includes an inbound track 12 on which rail vehicles can enter the classification yard 10. In many classification yards 10, the inbound track 12 includes a "hump" located just outside of a lower bowl area 13 of the classification yard 10. The hump can comprise a natural or artificial hill, which raises the inbound track 12 considerably above the level of the surrounding terrain. Operations at the hump of the inbound track 12 can be directed from a control tower 20 located near the hump. When directed by the control tower 20, a rail vehicle can be pushed over the hump at which point it rolls into the lower bowl area 13.

The lower bowl area 13 includes many sets of railroad tracks 14 (the classification tracks), which are used to assemble rail vehicles into consists. The tracks 14 come together and via switches allow a large number of the classification tracks 14 to reduce into a small number of outbound tracks 18. The consists are subsequently pulled by a locomotive on one of the outbound tracks 18 as part of a train exiting the classification yard 10. The removal of the consists by locomotives on the outbound tracks 18 and other operations within the lower bowl area 13 are typically directed from a panel conductor tower 22. Individuals located in the panel conductor tower 22 observe the operations in the lower bowl area 13 and monitor train scheduling. In a modern railyard, the actual control of the locomotives is performed by a qualified operator 24 using a "belly box" to remotely control the locomotives. While a single operator 24 is shown, it is understood that more than one such operator 24 may be present in a given classification yard 10, each of whom may be responsible for a given line or set of lines of track.

In the classification yard 10, consists can be assembled by rolling the rail vehicles over the hump to the classification tracks 14. Each additional rail vehicle added to a consist will tend to push the prior vehicles further down the track 14. To prevent rail vehicles from rolling out onto the outbound tracks 18, each classification track 14 can include a static retarder 16. In general, the retarder 16 squeezes the wheels of a rail vehicle between the main rail and additional retarder rails which border a track and run for some number of feet along the track, applying pressure to any passing wheels. Any rail vehicle which passes the retarder 16 for a given classification track 14 and enters a foul region 17 without being under control of a locomotive or the like is considered a rogue vehicle and needs to be prevented from exiting the classification tracks 14. Furthermore, as the classification tracks 14 may have a reduced separation closer to the track switch, the presence of a rail vehicle in the foul region 16 may result in a collision with other rail vehicles present on an adjacent track. This foul region 17 is often referred to as the fouling zone. The foul region 17 may be located some distance beyond the location of the static retarders 16. In some situations, a rail vehicle that has been, e.g., through a succession of impacts from other rail vehicles on the consist and forced past the location of the retarder 16 may still not be a rogue vehicle as it may be properly coupled to the other rail vehicles in the consist, and therefore unable to move further unless all of the rail vehicles in the consist move with it.

Figure 2:
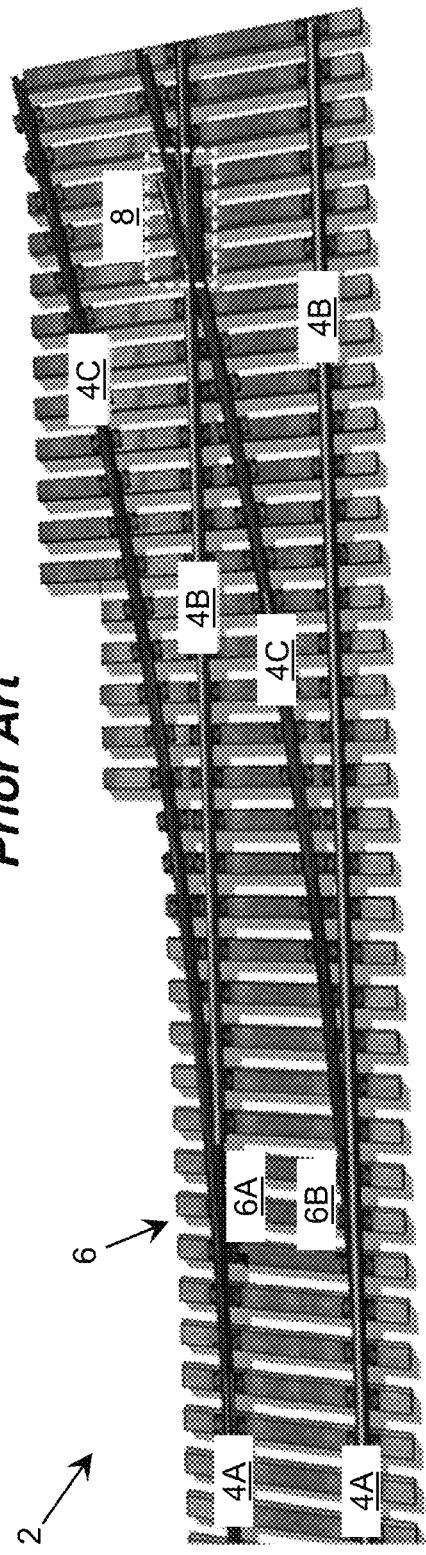
FIG. 2 shows an illustrative rail junction according to the prior art.

As illustrated, the classification yard 10 includes numerous locations where two pairs of railroad tracks diverge or converge (depending on the direction of travel). FIG. 2 shows an illustrative rail junction 2 according to the prior art. Depending on the direction of travel, the rail junction 2 can be a location at which a rail 4A splits into two pairs of rails 4B, 4C (when traveling from left to right) or a location at which two pairs of rails 4B, 4C converge into a single rail 4A (when traveling from right to left). For a rail vehicle moving from left to right, the junction 2 must include a mechanism for selecting which pair of rails 4B, 4C on which the rail vehicle will continue traveling after passing the junction 2. Typically, the pair of rails 4B, 4C is determined by setting a rail switch 6, which includes two points 6A, 6B. Each point 6A, 6B is a moveable, tapered section of rail that may either be in contact with the rail 4A or separated from the rail 4A by a sufficient distance to allow a rail wheel to pass by without contacting the point 6A, 6B. As illustrated, point 6B is set away from the rail 4A and point 6A is in contact with the rail 4A. As a result, a rail car traveling from left to right will proceed along rails 4B. Conversely, when point 6A is set away from the rail 4A and point 6B is in contact with the rail 4A, a rail car traveling from left to right will proceed along rails 4C.

Regardless, any rail vehicle traveling either direction through the rail junction 2 will reach a location at which the rails intersect. To allow the rail vehicle to continue to traverse the railroad tracks in its current direction, the junction must include a mechanism to allow the rail wheels to continue to roll in either direction. In general, such a mechanism is referred to as a frog 8. The frog 8 is a generally triangular-shaped section of metal, which is designed such that a rail wheel passing over the frog 8 will continue to roll in a direction determined by a set of wheels located on the frog 8 and the corresponding rail. Thus, a rail wheel traveling along rail 4B will continue along that path, while a rail wheel traveling along rail 4C will continue along its path.

Figure 3:
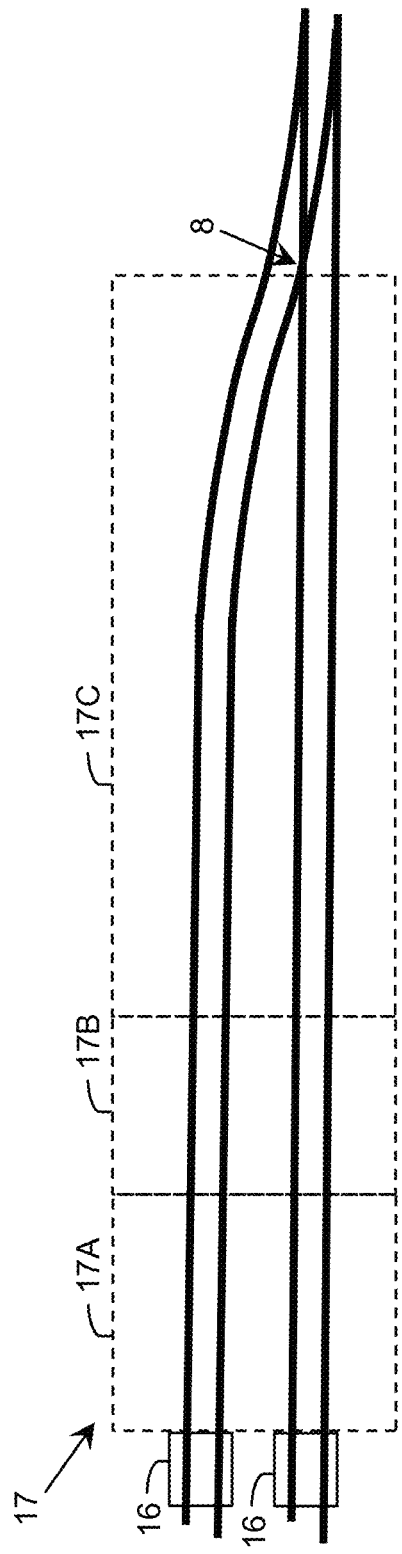
FIG. 3 shows an illustrative foul region according to an embodiment.

In an embodiment, the foul region 17 (FIG. 1) is divided into multiple zones. To this extent, FIG. 3 shows an illustrative foul region 17 according to an embodiment. In this case, the foul region includes: a caution zone 17A, which immediately follows the retarders 16 and can have an approximate length of, for example, one hundred twenty feet or thirty-seven meters; a guard band zone 17B extending from the caution zone 17A for a distance corresponding to a length of approximately one large rail vehicle (e.g., approximately eighty feet or twenty-five meters); and a definite foul zone 17C, which extends from the guard band zone 17B to a location of the frog 8. In an illustrative embodiment, the definite foul zone 17C has a length selected to allow enough time for personnel to move (e.g., by operating a locomotive) a rogue vehicle to an appropriate location, e.g., before it reaches the outbound track (e.g., passes the frog 8). Furthermore, the definite foul zone 17C can have a length corresponding to a region in which two adjacent tracks are too close together (e.g., since they are merging) to concurrently have rail vehicles traveling on both tracks without colliding (e.g., the presence of a rail vehicle on one track fouls the other track). In a more particular illustrative embodiment, the definite foul zone 17C has a length of at least approximately forty yards (36.5 meters). The length of the caution zone 17A can vary significantly, and can be determined by working from the location of the frog 8 backward to the retarders 16 to ensure that the definite foul zone 17C has a sufficient length.

Once a rail vehicle pass the frog 8, the rail vehicle will shortly pass through the switch for the relevant pair of tracks and either onward towards other rail vehicles exiting other pairs of tracks in the classification yard or, if it is the final switch in the set of tracks, the rail vehicle will exit the classification yard on the outbound tracks 18 (FIG. 1). An embodiment of the invention monitors the foul region 17 for such an event, and provides adequate warning of a developing situation so that railyard personnel can address the problem sufficiently early. In a more particular embodiment, the classification yard 10 (FIG. 1) includes multiple cameras located such that their combined fields of view provide full coverage of the classification tracks 14 (FIG. 1), and more particularly the foul region 17, where consists are assembled and taken by locomotives to the outbound tracks 18 and on to their destination. Each camera can be deployed with sufficient local computational capabilities (e.g., hardware and software), which allows observation and understanding of the operations taking place within the field of view to be performed at each individual location of a camera. For example, the processing component can detect and verify the movement of rail vehicles into areas (e.g., the foul region 17) which pose a potential collision hazard, while recognizing and discarding situations pertaining to normal operation within these areas (e.g., a locomotive attaching to a consist and subsequently leaving with the rail vehicles).

Figure 4:
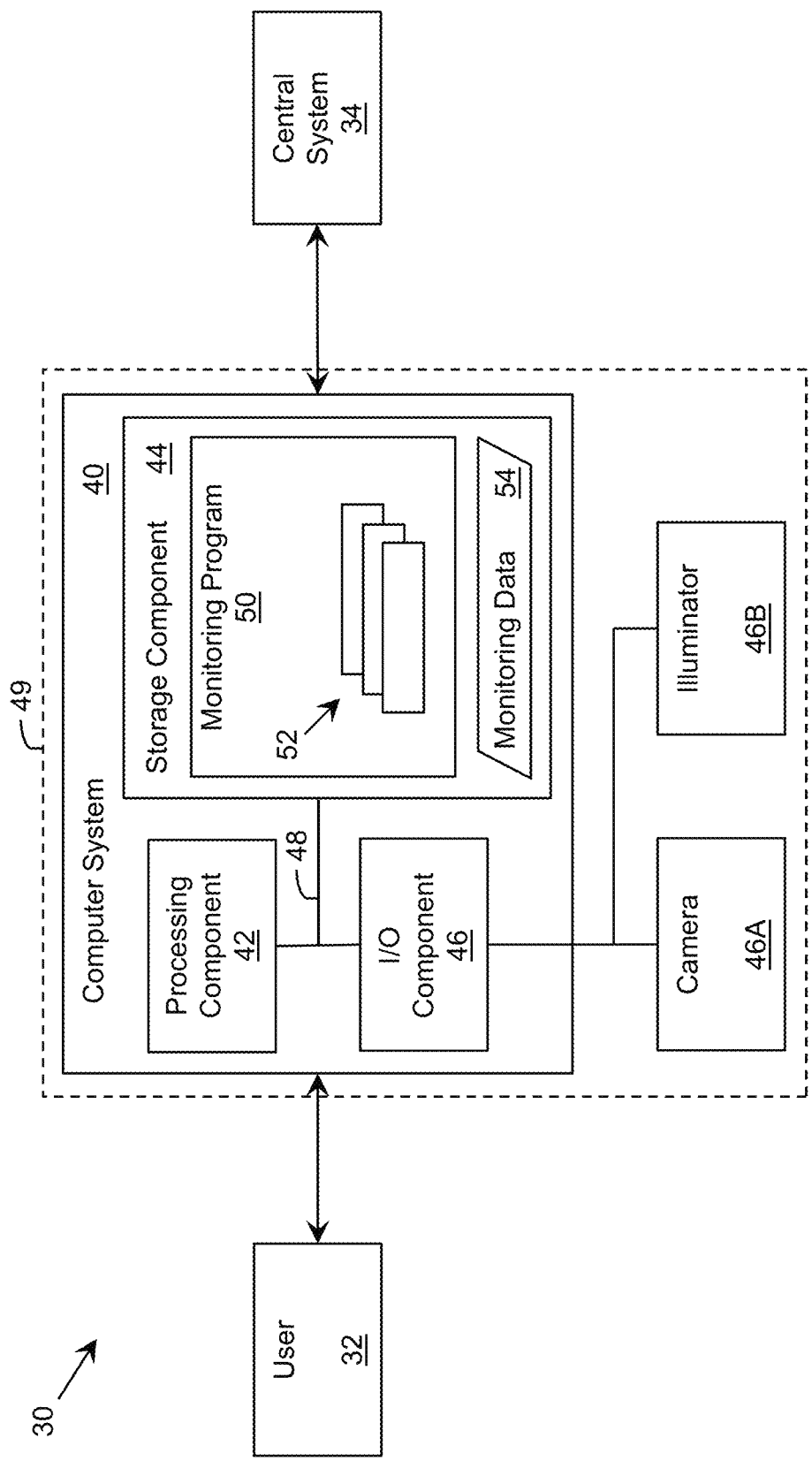
FIG. 4 shows an illustrative system for monitoring operations in an area according to an embodiment.

FIG. 4 shows an illustrative system 30 for monitoring operations in an area, such as a classification yard 10 (FIG. 1), according to an embodiment. To this extent, the system 30 includes a computer system 40 that can perform a process described herein in order to monitor operations in the area. In particular, the computer system 40 is shown including a monitoring program 50, which makes the computer system 40 operable to monitor the area by performing a process described herein.

The computer system 40 is shown including a processing component 42 (e.g., one or more processors), a storage component 44 (e.g., a storage hierarchy), an input/output (I/O) component 46 (e.g., one or more I/O interfaces and/or devices), and a communications pathway 48. In general, the processing component 42 executes program code, such as the monitoring program 50, which is at least partially fixed in storage component 44. While executing program code, the processing component 42 can process data, which can result in reading and/or writing transformed data from/to the storage component 44 and/or the I/O component 46 for further processing. The pathway 48 provides a communications link between each of the components in the computer system 40. The I/O component 46 can comprise one or more human I/O devices, which enable a human user 32 to interact with the computer system 40 and/or one or more communications devices to enable a system user, such as the central system 34, to communicate with the computer system 40 using any type of communications link. To this extent, the monitoring program 50 can manage a set of interfaces (e.g., graphical user interface(s), application program interface, and/or the like) that enable human users 32 and/or system users 34 to interact with the monitoring program 50. Furthermore, the monitoring program 50 can manage (e.g., store, retrieve, create, manipulate, organize, present, etc.) the data, such as monitoring data 54, using any solution.

In any event, the computer system 40 can comprise one or more general purpose computing articles of manufacture (e.g., computing devices) capable of executing program code, such as the monitoring program 50, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the monitoring program 50 can be embodied as any combination of system software and/or application software.

Furthermore, the monitoring program 50 can be implemented using a set of modules 52. In this case, a module 52 can enable the computer system 40 to perform a set of tasks used by the monitoring program 50, and can be separately developed and/or implemented apart from other portions of the monitoring program 50. As used herein, the term "component" means any configuration of hardware, with or without software, which implements the functionality described in conjunction therewith using any solution, while the term "module" means program code that enables a computer system 40 to implement the actions described in conjunction therewith using any solution. When fixed in a storage component 44 of a computer system 40 that includes a processing component 42, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 40.

When the computer system 40 comprises multiple computing devices, each computing device can have only a portion of the monitoring program 50 fixed thereon (e.g., one or more modules 52). However, it is understood that the computer system 40 and the monitoring program 50 are only representative of various possible equivalent computer systems that may perform a process described herein. To this extent, in other embodiments, the functionality provided by the computer system 40 and the monitoring program 50 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 40 includes multiple computing devices, the computing devices can communicate over any type of communications link. Furthermore, while performing a process described herein, the computer system 40 can communicate with one or more other computer systems, such as the central system 34, using any type of communications link. In either case, the communications link can comprise any combination of various types of optical fiber, wired, and/or wireless links; comprise any combination of one or more types of networks; and/or utilize any combination of various types of transmission techniques and protocols.

In an illustrative embodiment, the computer system 40 receives monitoring data 54 from one or more cameras 46A. The camera(s) 46A can be of any type suitable for operation in the intended operating environment (e.g., a classification yard) and have sufficient resolution and sensitivity to enable the computer system 40 to perform the desired image processing as described herein. In an embodiment, the camera(s) 46A can include one or more sensing modalities, such as visible light, near-infrared, infrared, or the like. The computer system 40 can perform multispectral fusion operations to assist in making a determination between normal and abnormal events in the area. Regardless, the computer system 40 can receive monitoring data 54 from the camera(s) 46A and process the data to monitor operations in the area. To this extent, the computer system 40 can implement any of a number of smart video analysis methods including, for example, those described in U.S. Pat. Nos. 7,355,508, 8,188,430, and 8,335,606, each of which is hereby incorporated by reference. In an embodiment, the computer system 40 is configured to perform a time-based discrimination and event understanding, observing a sequence of images and derive an understanding from changes in the view over time, and/or the like.

In some operating environments, there may simultaneously be too little and too much light within the field of view of a camera 46A. For example, during night operations at a classification yard 10 (FIG. 1), powerful headlights of locomotives or other powerful sources of light in the classification yard 10 may introduce considerable glare into the image, which can wash out portions of the image, while overall lighting during the night may be very low. In an embodiment, the computer system 40 can operate one or more illuminators 46B to provide sufficient light to an area being monitored. For example, the computer system 40 can determine that the area being monitored lacks sufficient light (e.g., using previously acquired image data, a light sensing device, and/or the like) and can activate one or more illuminators 46B in response. Similarly, the computer system 40 can determine when the area being monitored has sufficient light and can turn off the one or more illuminators 46B. An illuminator 46B can emit visible or other light into the field of view of the camera 46A to provide sufficient lighting for the camera 46A to acquire image data suitable for processing by the computer system 40. In a more particular embodiment, an illuminator 46B comprises a near-infrared emitting illuminator (e.g., a light emitting diode-based illuminator), which can emit acceptable levels of near-infrared radiation up to approximately 450 feet (approximately 137 meters) for a near-infrared sensitive camera 46A. Furthermore, when two or more illuminators 46B are used in concert, the distance can readily exceed 600 feet (183 meters).

To address too much light, e.g., from a locomotive or the like, any of several approaches can be utilized. For example, if the light source is in a portion of the image which is not relevant to the analysis (e.g., distant railyard lights), the portion of the field of view of the camera 46A can be physically blacked out. To address situations where the light source is too close to a relevant portion of the field of view, the camera 46A can include a filter, which can be selected to reduce or remove the peak wavelengths of light radiated by the interfering light sources. Use of such a filter can drastically reduce glare and allow the computer system 40 to clearly identify targets in the image data acquired by the camera 46A, which would otherwise have been obscured.

In an illustrative embodiment, the computer system 40, camera 46A, and illuminator 46B are configured to be deployed together as a single monitoring assembly 49. For example, the assembly 49 can comprise a single enclosure housing all of the components 40, 46A, 46B, or a mounting system on which one or more enclosures can be fixed. The location of the assembly 49 can be selected to enable the camera 46A to have a desired field of view of the area to be monitored.

Figure 5:
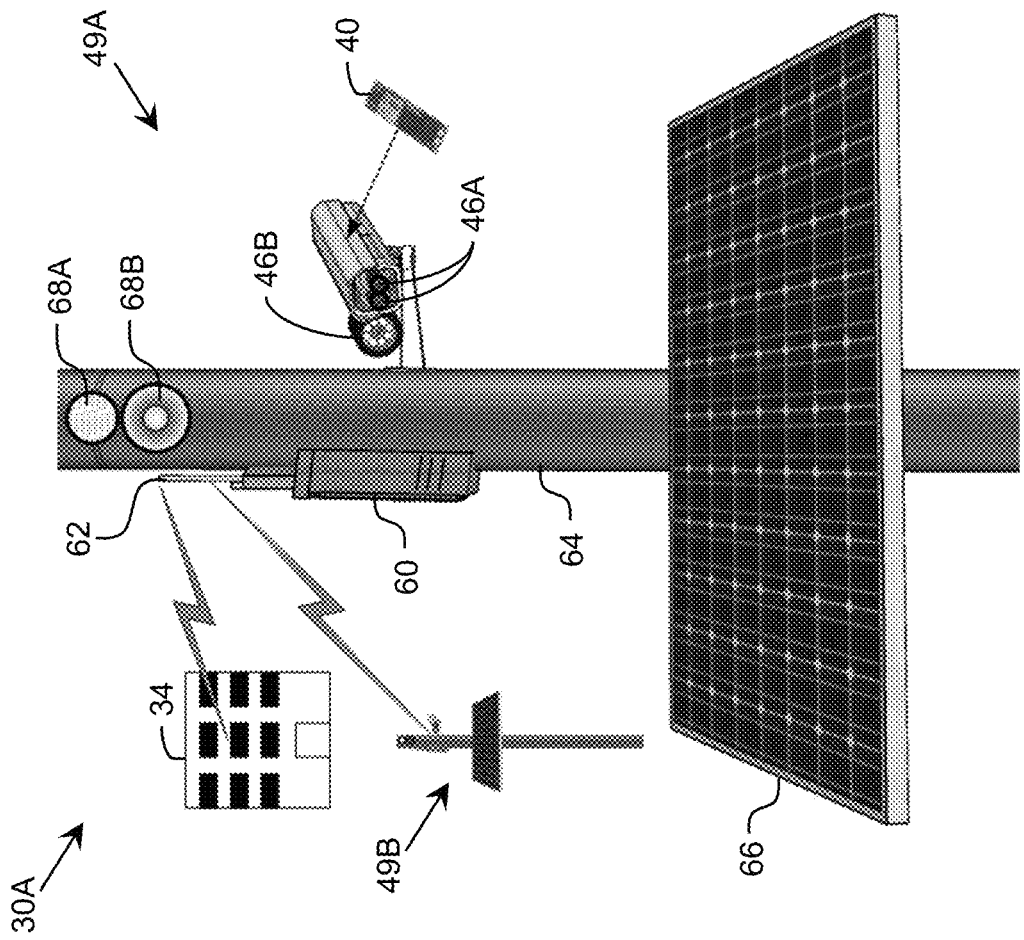
FIG. 5 shows another illustrative system for monitoring operations in an area according to an embodiment.

FIG. 5 shows another illustrative system 30A for monitoring operations in an area according to an embodiment. The system 30A is shown including two monitoring assemblies 49A, 49B, each of which can be configured similarly. As illustrated with assembly 49A, the assembly 49A can include a housing holding a pair of cameras 46A as well as a computer system 40 and other electronic support components. For example, the computer system 40 can comprise a low-power video processing system. In an embodiment, the computer system 40 is a computer-on-module (COM), such as an Overo COM offered by Gumstix, Inc. The assembly 49A also is shown including an illuminator 46B, which can be operated by the computer system 40, when necessary, to provide sufficient light of the requisite spectral bands for the cameras 46A to acquire image data capable of being processed by the computer system 40 up to at least a required distance.

The assembly 49A is shown including various other components. For example, the assembly 49A is shown including a transceiver 60 and an antenna 62, which can enable wireless communications between the assembly 49A and the central system 34 and/or another assembly 49B. Such communications can include receiving software updates (e.g., modifications of the target region of interest, new parameters for detection of alerts, and/or the like) from the central system 34. While shown mounted separate from the computer system 40 and the cameras 46A, it is understood that the transceiver 60 could be mounted in the same enclosure as the computer system 40 and/or the cameras 46A. It is understood that utilization of a wireless communications solution is only illustrative and any communications solution, including a wired solution, can be utilized.

To provide a large field of view for the cameras 46A, the assembly 49A can be mounted high from the ground/tracks, e.g., on a pole 64. For example, the cameras 46A can be mounted at a height of approximately fifty feet (approximately fifteen meters) or more. Such a mounting can use any solution and can be permanent or temporary. Furthermore, the various components can receive power through a wired connection to a power grid. In an embodiment, the assembly 49A includes a local power source, such as a solar panel 66, which can be configured to provide sufficient power to enable the operation of the various electronic devices of the assembly 49A. In this case, the assembly also can include sufficient power storage (e.g., a battery) to enable operations when the local power source does not generate sufficient power (e.g., no sunlight).

When the computer system 40 determines a presence of one or more alert conditions, the computer system 40 can communicate the condition to yard personnel and/or the central system 34. For example, the central system 34 can be located in the panel conductor tower 22, from which operations in the lower bowl area 13 (FIG. 1) are generally directed. Additionally, to alert other personnel in the local vicinity, such as a qualified operator 24 (FIG. 1), the assembly 49A can include one or more local alert components, such as an alert light 68A, a klaxon/alarm horn 68B, and/or the like. Furthermore, the assembly 49A can communicate an alert to another assembly 49B, which also can activate one or more components for alerting personnel in response.

In an embodiment, the assemblies 49A-49B can be configured to form a self-organizing network, with one of the assemblies 49A-49B designated as a master node, e.g., for communicating with the central system 34. For example, each assembly 49A, 49B can perform the entirety of the detection, tracking, recognition, and evaluation functions itself. Furthermore, each assembly 49A, 49B can trigger a local alert or relay a general alert to the central system 34 or other system through the designated master node and/or one or more additional nodes. Should the master node fail, the remaining assemblies 49A, 49B in the network can automatically reconfigure the network and select a new master node, thereby allowing full flexibility and continuity of operation. While not necessary, use of a master node as a single interface between multiple assemblies 49A, 49B and the central system 34 can simplify communications issues when interfacing two disparate systems.

Figure 6:
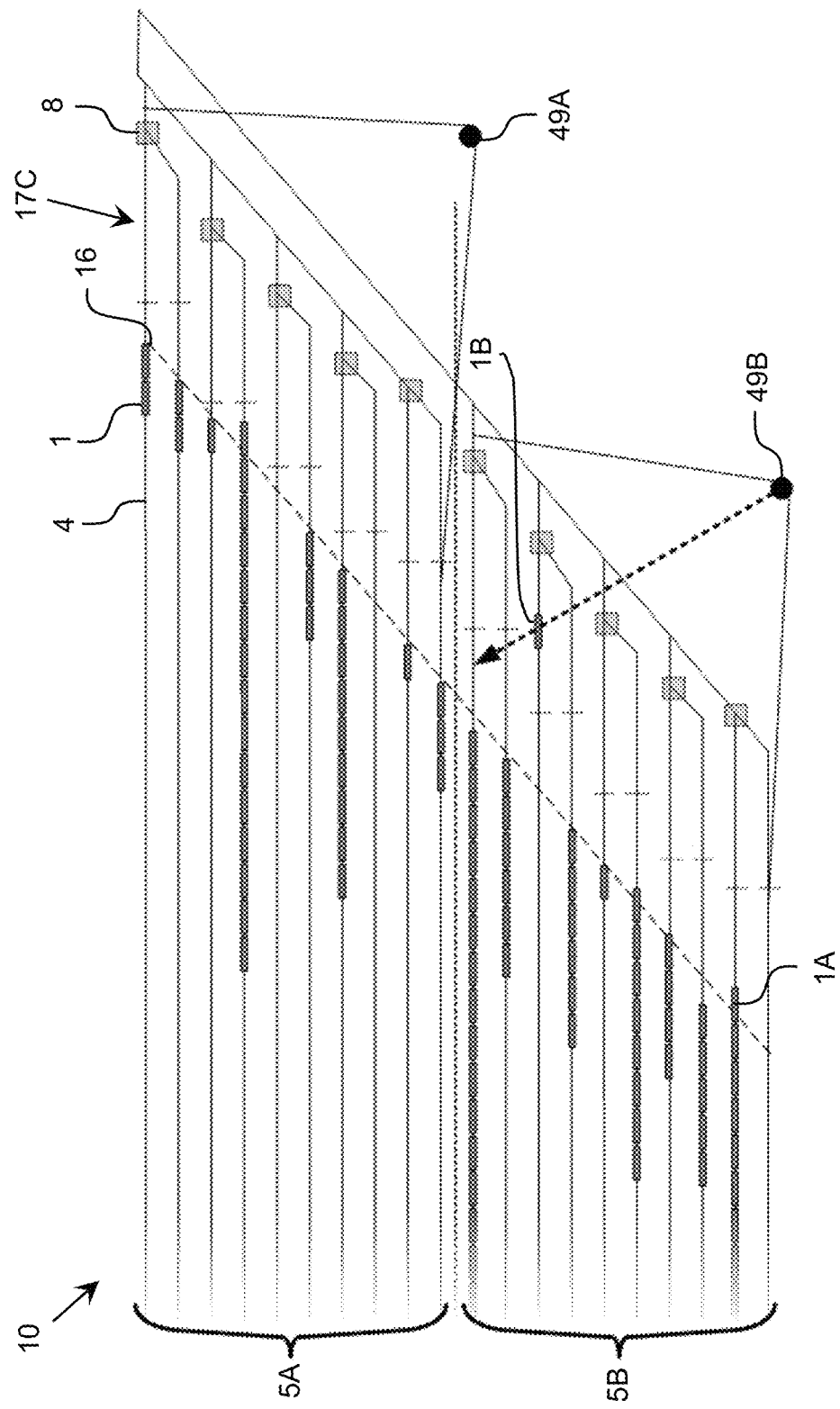
FIG. 6 shows a more detailed view of a portion of the railroad classification yard of FIG. 1 according to an embodiment.

As described herein, an embodiment of the invention can use one or more assemblies 49A, 49B to monitor operations in a railroad classification yard 10 (FIG. 1). To this extent, FIG. 6 shows a more detailed view of a portion (the lower right portion) of the railroad classification yard 10 according to an embodiment. This portion of the classification yard 10 includes several railroad tracks 4, which are divided into two groups 5A, 5B, as illustrated by the dotted line, each of which exits this portion of the classification yard on a different track. It is understood that the classification yard 10 is only illustrative of the number of tracks 4 and how tracks 4 can be divided. For example, a typical classification yard 10 may have many more tracks 4 with different groupings 5A, 5B.

Various consists of rail vehicles 1 are shown located on the tracks 4. The rail vehicles 1 on each consist are prevented from continuing to roll down a given track 4 by a retarder 16 as well as their connection to other rail vehicles 1 in the consist. A rail vehicle 1 located past the retarder 16 for the track 4 and not under control of a locomotive, or the like, is a potential rogue vehicle. In practice, a rail vehicle, such as the rail vehicle 1A, may move past the retarder 16 for the track 4, e.g., due to the repeated impacts of rail vehicles 1 coupling to the consist, but not be a rogue vehicle since it is remains connected to the other rail vehicles 1 in the consist and is therefore not uncontrolled. Furthermore, a rogue vehicle, such as vehicle 1B, must be identified with sufficient warning to enable the rogue vehicle 1B to be caught and controlled by personnel (e.g., by using a locomotive to remove the rogue vehicle 1B from the foul zone 17C, from the track entirely, and/or the like). In an embodiment described herein, the definite foul zone 17C for a track 4 starts (as indicated by the perpendicular dotted line intersecting each track 4) from the frog 8 and ends some distance from the retarder 16. The total distance of the definite foul zone 17C can be the same for each pair of tracks 4 connected by the same frog 8 and can be selected to provide sufficient time for catching and controlling a rogue vehicle 1B. The definite foul zone 17C can be a designated area, within which any vehicle 1 that is present without being controlled by a locomotive or the like is considered a rogue vehicle 1B.

The classification yard 10 can include a sufficient number of monitoring assemblies 49A, 49B to enable effective monitoring of each of the definite foul zone 17C of each of the tracks 4. In an embodiment, the classification yard 10 includes a monitoring assembly 49A, 49B configured to monitor each of the tracks 4 in a group 5A, 5B. The monitoring assembly 49A, 49B can be mounted at a location and height sufficient to prevent any intervening rail vehicles 1, trains, or the like, from blocking a line of sight between the corresponding camera(s) 46A (FIG. 5) and the various tracks 4 in the corresponding group 5A, 5B.

A location of the start of the definite foul zone 17C and the location of the frog 8 for each pair of tracks 4 in a group 5A, 5B define the definite foul zones 17C of tracks 4 being monitored using a monitoring assembly 49A, 49B. These locations on each side of the group 5A, 5B can define the minimum required limits for the field of view of the camera (s) 46A for the monitoring assembly 49A, 49B, which will include all of the frogs 8 for the group 5A, 5B. The monitoring assembly 49A, 49B can be configured such that everything within the field of view is visible to the camera(s) 46A. When a rail vehicle 1B is identified as being within the definite foul zone 17C without being controlled by a locomotive or the like, the monitoring assembly 49A, 49B (e.g., the computer system 40 (FIG. 5) included therein) can identify the vehicle as a rogue vehicle 1B. In response, the monitoring assembly 49A, 49B (e.g., the computer system 40) can generate an alert, e.g., using a local alert component (e.g., an alert light 68A (FIG. 5), a klaxon/alarm horn 68B (FIG. 5), and/or the like), sending an alert message for processing by the central system 34 (FIG. 5), and/or the like.

A significant challenge to implementing a smart video system is to accurately determine a three-dimensional location of a target seen by a two-dimensional camera. For example, considering the dashed line of sight shown for the monitoring assembly 49B, it can be seen that the line of sight cuts across no fewer than four separate classification tracks 4 as well as two outbound tracks (located to the right of the frogs 8). Furthermore, a rail vehicle 1B, which is located well within the definite foul zone 17C for the corresponding track 4, would be barely entering the definite foul zone 17C of the further tracks 4. As a result, a solution should enable the computer system 40 to discriminate between targets (e.g., rail vehicles 1) located on different tracks 4, but along the same basic line of sight.

In an embodiment, a high mounting location for the monitoring assembly 49A, 49B, which can prevent the camera(s) 46A view from being blocked by nearby rail vehicles 1, can provide a look-down angle allowing for some separation between the tracks 4 in the two-dimensional space. However, for any single line of sight, ambiguities in location will still remain. Any practical mounting height will allow the camera(s) 46A to image a top portion of rail vehicles 1 on other tracks 4, but not the tracks 4 themselves. It should be noted that even essentially low rail vehicles 1, such as flatbeds, have either center or side rails of sufficient height and size to be imaged by the camera(s) 46A. However, while a human viewer can fairly readily determine which vehicle 1 is on which track 4 and where, relatively, the vehicles 1 are on the tracks 4, a computer system 40 may have no understanding of the imaged scene. Furthermore, providing a sufficient understanding to the computer system 40 continues to be extremely complex, challenging to create, and currently unreliable.

In various applications, such as railroad classification yards, reliability is an important requirement. A typical railroad classification yard 10 operates continuously year round, and unnecessary stoppages are costly. For this reason, railroad classification yards 10 also can not afford to fail to stop operations when it is, in fact, necessary, because an accident at the wrong part of the railroad classification yard 10 could severely impact these operations. Thus, any solution relying on analysis methods which are not extremely close to 100% reliable and accurate will not be acceptable in this, or similar, applications. An embodiment of the monitoring assembly 49A, 49B can be configured to measure location of a target (e.g., a rail vehicle) to any desired accuracy sufficient to provide the target reliability. The accuracy can vary based on a distance between the target and the camera(s) 46A, a resolution of the image data, a proximity of other objects, and/or the like. In an embodiment, the monitoring assembly 49A, 49B calculates a location of a rail vehicle in the monitored area to an accuracy of no worse than approximately three feet (approximately one meter), and an accuracy of a foot (approximately one third of a meter) or less in critical locations.

In an embodiment, during an initial set up of the monitoring system 30 (FIG. 4), the computer system 40 for each monitoring assembly 49A, 49B is calibrated with image data of the monitored area, such as the relevant portion of the railroad classification yard 10, acquired by the corresponding camera(s) 46A after installation and data regarding static features present in the monitored area. For example, the data regarding the static features can include geographic information system (GIS) data of the monitored area. The GIS data of the classification yard 10 can be obtained by the computer system 40 using any solution and stored as monitoring data 54 (FIG. 4). For example, the central system 34 can provide the GIS data directly in machine-readable form by the railyard, the computer system 40 can derive the GIS data using computerized and/or human-performed approaches, the computer system 40 can derive the GIS data from other data, such as detailed overhead aerial images, and/or the like. Information regarding the static features in the image data can be used to define a set of alert criteria/conditions. For example, a user can define a region, such as a restricted area, within the monitored area using the static features present in the image data.

In any event, the GIS data can provide a priori knowledge regarding the physical relationship and spacing between key components of the classification yard 10. For example, during an initial imaging and/or over time, various components, such as the retarders 16 and frogs 8 for the tracks 4 being monitored will be visible in the image data and can be identified using any solution (e.g., by a human user, using shape recognition, and/or the like). The computer system 40 can combine knowledge of the locations of these components within the two-dimensional image data with the GIS data to create an accurate registration map (e.g., a two-dimensional projection of a three-dimensional model) of the imaged field of view. In an embodiment, the registration map includes data regarding the exact extent and positioning of the tracks within the image data. The computer system 40 can create an accurate registration map given certain assumptions, e.g., locations of known landmarks and layout information of the imaged area. To this extent, the computer system 40 can use the GIS data and the image data to discriminate between movements and objects on all tracks 4 being monitored by the computer system 40 and properly trace the movement of all rail vehicles in time and space throughout the field of view.

Furthermore, the computer system 40 can use known dimensions and characteristics inherent and/or added to the monitored area. For example, in the classification yard 10, the dimensions of the railroad tracks 4, which are and must be invariant within a very small tolerance, can be used to create the registration map. For example, in North America, track gauge is 4 feet, 8.5 inches, and is maintained to within a tight tolerance. This spacing allows a direct check of other dimensions within the field of view. For a particular classification yard 10, specific distances to other components, such as the frogs 8, may also be well known to within extremely small limits. Furthermore, one or more temporary artifacts can be located at known, critical locations (e.g., to define the extents of the various zones). During calibration, the computer system 40 can use images acquired with the temporary artifacts in place to create the registration map. As a result, there may be multiple landmarks for use by the computer system 40 during calibration and/or when verifying distances within the field(s) of view of the camera(s) 46A. However, after calibration, these landmarks no longer need to be visible within the image data (e.g., can be removed, covered by snow, etc.) as their locations have been virtualized in the registration map. With such knowledge, the computer system 40 can readily determine the three-dimensional equivalence of various locations in the two-dimensional image data with or without various landmarks being visible in the image data.

As discussed herein, there is no single inherent three-dimensional location for any two-dimensional point on an image. However, there are known conditions which the computer system 40 can apply to any image to determine an unambiguous location. In an embodiment, the conditions for a classification yard 10 are derived from two basic principles. First, at least one rail vehicle 1 will be fully visible (not blocked from view) in any given situation, even if other rail vehicles 1 are blocked from view, which will enable the computer system 40 to directly localize at least one such rail vehicle 1 using the calibrated location of a particular set of tracks 4 on the two-dimensional image plane. Second, the tracks 4 are effectively immovable and the only locations where rail vehicles 1 can be found. From this, the computer system 40 can easily detect rail vehicles 1 moving on tracks 4, which are obscured by other rail vehicles 1. Furthermore, the computer system 40 can determine from the spacing of the visible tops of the rail vehicles 1, on which track 4 each rail vehicle 1 is located, and from this, a precise location of each rail vehicle 1.

Figure 7:
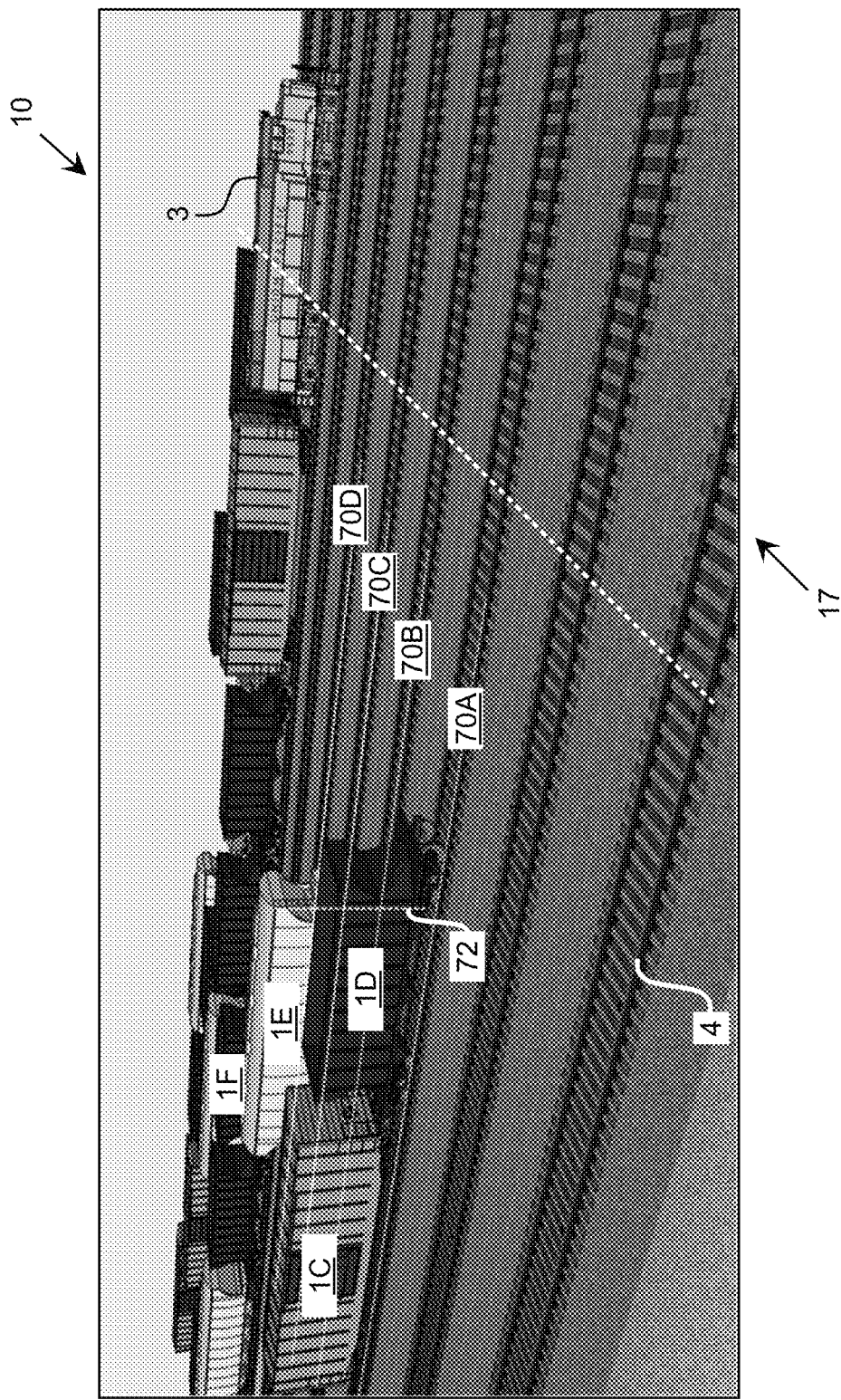
FIG. 7 shows an illustrative hypothetical image of a monitored classification yard according to an embodiment.

FIG. 7 shows an illustrative hypothetical image of a monitored classification yard 10 according to an embodiment. The image includes various rail vehicles in the classification yard 10 and includes a location at which the retarders 16 (FIG. 6) end and the foul zone 17 begins as indicated by the dashed line intersecting each of the tracks 4. The closest two rail vehicles 1C, 1D are shown partially obscuring a rail vehicle 1E located on another track, which in turn partially obscures rail vehicles, such as a rail vehicle 1F, located on tracks further from the camera 46A (FIG. 5). Using only the data in the image, it is difficult for the computer system 40 (FIG. 5) to determine on which track the rail vehicle 1E is located with a high degree of certainty.

However, after calibration described herein, the computer system 40 can use monitoring data 54 (FIG. 4) regarding the exact extent and positioning of the tracks 4 to calculate track guidelines 70A-70D corresponding to some particular portion of a track 4, e.g., the nearer rail of one or more tracks 4. Additionally, the computer system 40 can generate a rail vehicle guideline 72 corresponding to a particular location on the rail vehicle 1E, e.g., a front corner of the rail vehicle 1E. As illustrated, the rail vehicle guideline 72 can start at a top corner of the rail vehicle 1E. The guideline 72 will intersect the track guidelines 70A-70D at an approximate location where the rail vehicle 1E would be expected to rest if the rail vehicle 1E is on the corresponding track 4. The computer system 40 can use the intersection between the rail vehicle guideline 72 and each of the track guidelines 70A-70D to establish an approximate distance of the rail vehicle 1E from the camera 46A that acquired the image for each of the tracks 4 on which the rail vehicle 1E may be located.

The computer system 40 can calculate a total length of the rail vehicle guideline 72 for each of the track guidelines 70A-70D corresponding to a track 4 on which the rail vehicle 1E may be located. Using the distance of the rail vehicle 1E from the camera 46A and the length of the rail vehicle guideline 72 corresponding to each of the track guidelines 70A-70D, the computer system 40 can calculate an approximate height of the rail vehicle 1E if it is located on each of the corresponding tracks 4. The computer system 40 can identify a general type of the rail vehicle 1E and compare the calculated heights with a known range of heights for the type of rail vehicle 1E. The computer system 40 can identify the track 4 on which the rail vehicle 1E is located by identifying a track guideline 70A-70D for which the calculated height best fits with the known range of heights. In the example shown, the computer system 40 can determine that the rail vehicle 1E is located on the track 4 corresponding to the track guideline 70C. The computer system 40 also can implement a similar process to identify a track 4 on which the rail vehicle 1F is located, which also can be determined by observing that the rail vehicle 1F is connected to other rail vehicles, for which the track is visible, located on the same track in a consist.

As described herein, a locomotive 3 may be present in the image data and may affect a determination by the computer system 40 as to whether an alert condition is present. Furthermore, the computer system 40 should not generate a false alert in response to the locomotive 3 being present within a definite foul zone. To this extent, a locomotive 3 is not rolled into the classification yard 10 in the same manner as the rail vehicles. Rather, the locomotive 3 is sent into the classification yard 10 to pick up a given consist and remove the rail vehicles in the consist from the classification yard 10. As a result, rail vehicles accompanied by a locomotive are expected to continue to move and pass through the foul region as they are under power of the locomotive 3 and are presumably meant to move on to the main line. Furthermore, a locomotive 3 will enter the classification yard 10 in the opposite direction as the rail vehicles through the foul region. The computer system 40 should ignore movements and the presence of a locomotive 3 in the foul region as it is under power and will be deliberately operated through these areas.

An embodiment of the computer system 40 can implement one or more processes to identify a locomotive 3 and exclude its movements and actions from generating an alert. For example, the monitoring assembly 49 (FIG. 4) can include one or more cameras 46A sensitive to infrared radiation. As rail vehicles generally have no inherent heat sources, and those that do (e.g., a refrigerator car with a generator to keep the refrigeration operating) will have a heat profile readily distinguishable from that of a locomotive 3, the computer system 40 can be configured to identify the heat profile of the locomotive 3 (e.g., three stacks producing hot exhaust and considerable heat radiating from other areas). Furthermore, the computer system 40 can combine (fuse) this approach with additional techniques to provide a robust and powerful solution for identifying and tracking a locomotive 3 in the classification yard 10.

In various applications, use of an infrared sensitive camera 46A may not be desired. For example, infrared cameras are more expensive and generally have a lower resolution than cameras sensitive to light in the visible spectrum, which makes utilizing infrared cameras a challenge for applications described herein. To this extent, an embodiment can include an infrared camera 46A, which provides confirmatory data for use by the computer system 40, and can enable the computer system 40 to detect other conditions or events of interest (e.g., a leak, a fire, etc.). In an embodiment, the computer system 40 performs the various functions described herein using image data acquired by visible and/or near-infrared cameras 46A, which have far higher resolutions and also are much less expensive. Moreover, as described herein, the computer system 40 can be configured to perform other operations which would not be enabled specifically by infrared image data, but which require intelligent processing by the computer system 40. Nonetheless, when included, data acquired by one or more infrared cameras 46A can provide the computer system 40 powerful additional tools for detecting, tracking, recognizing, and/or the like, active rail vehicles 1.

In general, a train can be assembled from multiple consists. The general procedure is for a locomotive 3 to enter, pick up the first consist, move out until the last car of the consist is past the appropriate switch. The switch is then moved to send the train to the track 4 with the next consist. The locomotive 3 then backs the consist through the switch until the last car in the current consist reaches the first in the new consist. The two consists are then linked and this procedure is repeated until the entire train is assembled, at which point the train can depart the classification yard 10. In an embodiment, the computer system 40 tracks movement of vehicles 1, 3 coming from the exit direction, rather than the entrance direction, and ignores the movement of these vehicles 1, 3 when determining whether an alert condition is present (e.g., a rogue vehicle). Such vehicles will be either locomotives 3 coming to pick up a consist, which will be part of their train, or rail vehicles 1 of a consist which is already part of a train, coming to pick up the next consist to be added to the train.

FIGS. 8A-8D show an illustrative series of hypothetical images of a monitored classification yard according to an embodiment. In FIG. 8A, rail vehicles 1G, 1H are shown located behind the start of the definite foul zone (as indicated by the dashed line that intersects all of the tracks 4 in each of the images). Additionally, a locomotive 3 is imaged entering from the right and moving towards the rail vehicles 1G, 1H. Using the image data and processing described herein, the computer system 40 (FIG. 5) can determine that the locomotive 3 is traveling on the same track 4 as that on which the rail vehicles 1G, 1H are located. Furthermore, using multiple images captured at known times as well as location data regarding the monitored area, the computer system 40 can readily determine the speed and direction of movement of a target vehicle, such as the locomotive 3 by tracking differences in its location through the series of images.

To this extent, the computer system 40 can track all unique vehicles, including vehicles 1G, 1H and the locomotive 3, to identify various events. For example, the computer system 40 can determine that a given target, such as the locomotive 3, entered the definite foul zone under its own power and exited the definite foul zone moving in an opposite direction as that used to trigger an alert. As a result, the computer system 40 can assign a status code to the locomotive 3 indicating that the locomotive can move freely through the definite foul zone without generating an alert.

In FIG. 8B, the locomotive 3 is imaged crossing the boundary of the definite foul zone. However, as the computer system 40 can determine the direction of movement and/or that it is moving under its own power, the computer system 40 will not generate any type of alert. In FIG. 8C, the locomotive 3 has reached the location of the rail vehicles 1G, 1H and linked with them. In this case, the computer system 40 can recognize that the connected vehicles now form a train, which is capable of moving on its own without generating an alert. In an embodiment, the computer system 40 can assign each rail vehicle 1G, 1H in the train the same status code as the locomotive 3, which will result in the entire train being exempted from generating a foul alert as the computer system 40 can assume that any movement of the train occurs as part of normal train assembly operations.

As a result, as shown in FIG. 8D, when the locomotive 3 and the rail vehicles 1G, 1H commence movement into the definite foul zone, the computer system 40 will not generate an alert. However, the computer system 40 can monitor the movement of the various exempt rail vehicles 1G, 1H to confirm that the vehicles are all part of a train. For example, a rail vehicle 1G, 1H may not be properly attached, become detached, purposefully not be attached (e.g., when the operator is informed that the locomotive 3 is on the wrong track 4), and/or the like. In this case, the computer system 40 can determine that the rail vehicle(s) 1G, 1H are not moving at the same velocity as the locomotive 3 and can remove the exempt status for the rail vehicle 1G, 1H. Furthermore, in the event that the rail vehicle 1G, 1H is within the definite foul zone, the computer system 40 can generate an alert as described herein.

As illustrated in FIGS. 7 and 8A-8D, the monitoring assembly can be located such that the camera(s) have a generally side-oriented view with respect to the tracks 4 and the corresponding movement of vehicles through the monitored area. However, it is understood that this is only illustrative and another view angle can be utilized, such as a more head-on oriented view with respect to the direction of the tracks 4.

To this extent, FIG. 9 shows an alternative viewpoint for monitoring a classification yard according to an embodiment. In this case, the camera(s) 46A can acquire image data from a location "downstream" (after the tracks 4 have begun to come together). As a result, the monitoring assembly 49 (FIG. 5) can be mounted in a location which places it nominally in front of some of the tracks (such as those in the central portion of the monitored area) and closer to the front of other tracks (such as those on the ends of the monitored area). Illustrative locations of switches 6 and frogs 8 are shown for the tracks 4 included. It is understood that some of the tracks 4 are omitted from FIG. 9 for clarity. For tracks 4 in which the corresponding frog 8 is not visible (such as those tracks located on the right side of the image), these tracks 4 can be ignored by the monitoring assembly 49 and monitored using another assembly.

As can be seen, one advantage of this viewpoint is an ability for the camera(s) 46A to more readily image shorter rail vehicles. For example, a rail vehicle 1K can comprise a standard boxcar, while the rail vehicle 1J can comprise a gondola car. A typical gondola car 1J has a height of approximately seven feet, while a typical boxcar 1K has a height of approximately twelve to thirteen feet. Unlike other types of rail vehicles that have a low profile, a gondola car 1J typically does not have additional structure (e.g., poles or upright portions) that reach higher than seven feet. As a result, when a side view is used with closely spaced tracks 4, a camera 46A may not have a sufficiently steep viewing angle for more distant tracks to image a gondola car 1J located adjacent to a far side of a boxcar 1K. However, it is understood that this issue may not be a concern for all applications (e.g., an application where the targets all have similar profiles). Use of an end-on viewing angle also can enable the computer system 40 to more readily identify the most forward extent of the rail vehicle(s), which corresponds to a determination of a fouling alert condition, and the image data can provide additional information when, for example, a locomotive uncouples from rail vehicles and leaves them in the foul zone.

A significant difference in this viewing angle is changes in the relative spacing of key components present in the classification yard. For example, the relative spacing in the two dimensional image between the switch 6 and frog 8 for each of the tracks 4 changes significantly for different tracks 4 that are imaged, depending on the angle of view for the track 4. Were the locations of the switches 6 for the leftmost tracks 4 indicated, the locations would be extremely close to the corresponding frogs 8. As a result, an ability of the computer system 40 (FIG. 5) to properly account for the shift in angles across the field of view is an important aspect of extracting accurate three-dimensional analysis data from this image data.

As described herein, a beginning of the definite foul zone can be defined as being a fixed distance back from the corresponding frog 8 for the track 4. As illustrated by the spacing between the frogs 8 and switches 6, as the view becomes closer to an end-on perspective, the relative distance in the two-dimensional scene corresponding to any given actual distance of the track 4 becomes smaller. As a result, a determination of a distance a rail vehicle has traveled using image data acquired from the perspective shown in FIG. 9 will require a different approach and analysis from that used for the side-oriented perspective described herein.

Since variations in distance on the various tracks 4 may not result in a readily measurable shift in position of a target rail vehicle, the computer system 40 can implement another approach to determine distance accurately. In an embodiment, one approach uses a width of a feature, such as a rail vehicle. In general, rail vehicles have a very constrained set of widths and once the computer system 40 identifies a type of rail vehicle, an actual width of the rail vehicle can be determined using standard width data, which can be included in monitoring data 54 (FIG. 4). Using a known width of the rail vehicle, an apparent width of the rail vehicle will vary directly with distance from the camera 46A. Therefore, the computer system 40 can use an apparent width of the rail vehicle in the image data to derive an actual distance from the camera 46A, and therefore a precise distance from the relevant frog 8, which is located a known distance from the camera 46A from calibration. The computer system 40 can use the distance of the rail vehicle from the frog 8 to determine whether or not the rail vehicle is entering the definite foul zone.

The computer system 40 can use one or more known dimensions to verify the apparent width of the rail vehicle. For example, the computer system 40 can determine the apparent width between two rails of the track 4 on which the rail vehicle is located and use a known width of the rails to calculate a distance measurement for the rail vehicle. In this case, the computer system 40 can use a location on the track 4, which is just before the track 4 is obscured by the rail vehicle being monitored. Similarly, the computer system 40 can use other known distances. For example, during calibration, it may be determined that two adjacent tracks 4 are separated by a substantially constant, known distance for a region within which the rail vehicle is located. In this case, the computer system 40 can use an apparent separation of the tracks 4 at a location in the image data near the rail vehicle to verify/derive the distance to the rail vehicle. In another embodiment, the computer system 40 can determine a location of the rail vehicle without using any rail vehicle dimensions. For example, the computer system 40 can identify a location of the low front extent of the rail vehicle, and compare the location to a mask for the tracks and the locations of the extents of the foul zones as included in a registration map created during calibration.

It is understood that the computer system 40 will need to account for the angular variation across the imaged field of view when determining measurements for each track 4. In an embodiment, the calibration routine described herein can account for the angular variations. For example, as the viewing angle within the field of view varies, a perpendicular across the tracks (or along the width of a rail vehicle) will change in angle. These angles will vary across the horizontal and vertical. The computer system 40 can determine the precise angle, e.g., during calibration, by deriving a trigonometric function describing the relationship between key components, such as the rails of each track 4.

As shown in FIG. 5, an embodiment of a monitoring assembly 49A can include a single imaging device 46A, or a pair of co-located imaging devices 46A (e.g., to provide multi-spectral image data, such as a visible/near infrared imaging device co-located with an infrared imaging device). The computer system 40 can perform accurate monitoring using image data acquired by a single imaging device 46A in conjunction with fixed geographic data regarding the area being monitored to derive all three-dimensional aspects of an imaged scene. Such geographic data can include, for example, known fixed geographic points, known basic constraints on dimensions and angles based on a particular design of a railroad classification yard, known constraints on dimensions and angles of components of rail yards, rail vehicles, and locomotives, careful trigonometric-based calculations, and/or the like. However, such an approach may encounter situations which render these measurement methods suspect, as the monitoring assembly 49A does not acquire data capable of direct, inherent three-dimensional measurement by the computer system 40.

To address this, FIG. 10 shows an illustrative monitoring assembly 49C according to another embodiment. The monitoring assembly 49C includes two camera enclosures, each with one or more cameras 46A, and each with an associated illuminator 46B. The camera enclosures are mounted in a manner that they are separated from each other by some distance. For example, each camera enclosure can be mounted on opposing ends of a crossbeam 69, which surmounts a support pole 64 at a desired height above the ground. In order to reduce an amount of weight on the crossbeam 69, one or more components, such as the computer system 40 (FIG. 5) can be mounted on the support pole 64, such as in an enclosure for the communications component 60.

The computer system 40 can operate the cameras 46A to substantially simultaneously capture image data. An advantage of such stereo imaging is that the separated cameras 46A provide differing points of view, which result in differences between the captured image data. These differences are precisely related to the distances of a given feature from each of the cameras 46A. To this extent, for any given target object in the field of view of both cameras 46A, there is one and only one possible location, which the computer system 40 can determine by an intersection of the line of sight from one camera 46A and the line of sight from the other camera 46A. The computer system 40 can use such data in conjunction with other distance determinations described herein to further verify and refine the measurement results.

While the monitoring assembly 49C is shown mounted on a single support pole 64, it is understood that multiple support poles 64 can be used, e.g., to provide further spacing of the cameras 46A and a wider baseline for three-dimensional imaging. Furthermore, when multiple monitoring assemblies are present and communicating over a network, a camera located at one monitoring assembly can capture image data, which is transmitted to a computer system at another monitoring assembly for processing. For example, as shown in FIG. 6, the monitoring assembly 49A can include a camera configured to capture image data of the tracks 4 in the group 5B. The computer system 40 of the monitoring assembly 49A can transmit such image data to the computer system 40 of the monitoring assembly 49B, where the image data can be processed and analyzed as described herein. Regardless, it is understood that, for stereo imaging implementations, one or more additional calibration actions may be necessary and/or a computer system 40 capable of additional processing may be required. For example, as twice the number of images need to be processed, the amount of image data that must be processed will double. Additionally, the calibration will need to register the images acquired by the cameras 46A, e.g., by matching the specific fields of view to each other so that the correspondences between the fields of view are extremely well known.

It is understood that while aspects of the invention have been primarily described in conjunction with monitoring vehicle movements, embodiments of monitoring assemblies described herein can perform one or more additional monitoring-related tasks, e.g., for security, safety, error identification, and/or the like. Illustrative tasks include, for example: confirmation of rail vehicles being routed to a correct consist; detection of leaks or malfunctioning equipment on a rail vehicle; identification of a presence of unauthorized personnel or personnel present in a restricted area; identification of rail vehicles; confirmation of correct routing of a locomotive when picking up a consist; and/or the like.

While aspects of the invention have been shown and described in conjunction with monitoring a railroad classification yard, it is understood that embodiments of the invention can be directed to various applications requiring the monitoring of operations within an area. For example, a large seaport can include many docking areas where cargo can be transferred from rail or truck to a ship, or vice versa. Similar issues of scheduling, traffic, etc., apply to operations in such a seaport as are present within the railroad classification yard operations as a limited number of access points for constant operations in freight movement dominates both areas. Additionally, such a seaport will include rules of movement for vessels along designated paths of travel which, though not guided by rails, are in place to assure safety and ease of ingress and egress. To this extent, an embodiment can monitor operations on the water as well as on land and track proper observance of rules of navigation along any number of paths of travel. Such an embodiment can include the use of infrared cameras, which can provide data to aid the computer system 40 in verifying a presence and characteristics of watercraft, virtually all of which are significantly warmer than the water. Still further, a similar embodiment can be utilized to monitor traffic within a marina with a high volume of watercraft entering and leaving.

A major warehousing or transportation hub also may have a similar challenge in having a limited set of routes for entrance and exit, while needing to properly load and transport vast amounts of cargo on trucks. To this extent, an embodiment can track truck loading and scheduling in such a hub. In a further embodiment, the computer system 40 can obtain local scheduling data, which the computer system 40 can use to verify that trucks are being loaded with the correct cargo based on tracking information.

While shown and described herein as a method and system for monitoring operations in an area, it is understood that aspects of the invention further provide various alternative embodiments. For example, in one embodiment, the invention provides a computer program fixed in at least one computer-readable medium, which when executed, enables a computer system to monitoring operations in an area. To this extent, the computer-readable medium includes program code, such as the monitoring program 50 (FIG. 4), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the monitoring program 50 (FIG. 4), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for monitoring operations in an area. In this case, the generating can include configuring a computer system, such as the computer system 40 (FIG. 4), to implement the method of monitoring operations in an area. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system comprising:
    a monitoring assembly including:
        a set of cameras, wherein the set of cameras includes at least one near infrared camera;
        a set of local alert components; and
        a computer system configured to monitor operations in a region by performing a method including:
            determining a location of a target at least partially visible in image data acquired by the set of cameras using data corresponding to a plurality of static features present in the region;
            evaluating the location with respect to at least one restricted zone in the region;
            in response to the evaluating indicating the target is at least partially located within a restricted zone, determining whether the target is being deliberately moved within the restricted zone, wherein the determining is based on at least one of: a direction of movement of the target within the restricted zone or a cause of movement of the target into the restricted zone; and
            activating at least one of the set of local alert components in response to determining the target is not being deliberately moved.

2. The system of claim 1, further comprising at least one additional monitoring assembly, wherein each monitoring assembly is configured to monitor operations in a unique sub-region of an area, and wherein each monitoring assembly further includes a wireless communications component configured to enable the computer system of each monitoring assembly to communicate with at least one computer system of another monitoring assembly.

3. The system of claim 2, further comprising a central system for managing operations in the area, wherein at least one computer system of the plurality of monitoring assemblies is configured to communicate with the central system.

4. The system of claim 1, the monitoring assembly further including a near infrared illuminator, wherein the method further includes operating the near infrared illuminator to provide sufficient light for the region.

5. The system of claim 1, wherein the monitoring assembly is mounted at a location providing a head-on oriented view with respect to a plurality of designated paths of travel of targets within the at least one restricted zone and at a height sufficient to prevent a line of sight of the set of cameras from being blocked due to normal operations in the region, wherein each target is located on one of a plurality of designated paths of travel, and wherein each of the designated paths of travel extends into the at least one restricted zone in the region.

6. The system of claim 1, wherein the region comprises a group of classification tracks in a railroad classification yard.

7. The system of claim 1, wherein the computer system is calibrated after deployment of the monitoring assembly to a location, wherein the calibration includes obtaining data regarding the plurality of static features in the region and identifying the plurality of static features in image data acquired by the set of cameras.

8. A method comprising:
    at each of a plurality of monitoring assemblies located within an area:
        acquiring image data for a region of the area using a set of cameras of the monitoring assembly;
        processing the image data using a computer system of the monitoring assembly to determine a location of each of a set of targets at least partially visible in the image data;
        the computer system evaluating the location with respect to at least one restricted zone in the region;
        in response to the evaluating indicating the target is at least partially located within a restricted zone, the computer system determining whether the target is being deliberately moved within the restricted zone, wherein the determining is based on at least one of: a direction of movement of the target within the restricted zone or a cause of movement of the target into the restricted zone; and
        the computer system activating at least one of the set of local alert components in response to determining the target is not being deliberately moved.

9. The method of claim 8, further comprising deploying the plurality of monitoring assemblies within the area, wherein the deploying includes mounting the set of cameras at a location providing a head-on oriented view with respect to a path of travel of targets within the at least one restricted zone and at a height sufficient to prevent a line of sight of the set of cameras from being blocked due to normal operations in the region.

10. The method of claim 8, further comprising calibrating the computer system of each of the plurality of monitoring assemblies, wherein the calibrating includes obtaining data regarding a plurality of static features in the region and identifying the plurality of static features in image data acquired by the set of cameras, wherein the computer system uses the data regarding the plurality of static features during the evaluating.

11. The method of claim 10, wherein the calibrating further includes creating a registration map of the region in the image data using the plurality of static features identified in the image data, wherein the computer system uses the registration map during the evaluating.

12. The method of claim 11, wherein the registration map includes a mask for a set of paths of travel for targets in the region.

13. The method of claim 8, wherein the region comprises a group of classification tracks in a railroad classification yard.

14. The method of claim 8, the method further comprising, in response to determining the target is not being deliberately moved, the computer system providing information regarding an alert condition for processing by at least one of: the computer system of another monitoring assembly or a central system managing the operations in the area.

15. A classification yard comprising:
a plurality of classification tracks having a first side from which rail vehicles enter for assembly in a consist and a second side from which consists exit the plurality of classification tracks, wherein each classification track includes a foul region defined by a mechanism located between the first and second sides for halting movement of a rail vehicle and a switch for merging the classification track with another classification track on the second side;
a monitoring assembly including:
   a set of cameras, each camera having a field of view that includes the mechanism and the switch for each of the plurality of classification tracks; and
   a computer system configured to monitor the foul region of each of the plurality of classification tracks by performing a method including:
      determining a location of a rail vehicle at least partially visible in image data acquired by the set of cameras using data corresponding to a plurality of static features present in the classification yard;
      evaluating the location with respect to the foul region for a classification track on which the rail vehicle is located; and
      in response to the evaluating indicating the rail vehicle is at least partially located within the foul region, determining a presence of an alert condition using a series of images including the rail vehicle, wherein the alert condition is present when the rail vehicle is not being deliberately operated, wherein the determining is based on at least one of: a direction of movement of the rail vehicle within the foul region or a cause of movement of the rail vehicle into the foul region.

16. The yard of claim 15, wherein the classification yard includes multiple groups of classification tracks, each group of classification tracks including a subset of the plurality of classification tracks and having at least one monitoring assembly configured to monitor the foul region of each classification track in the group.

17. The yard of claim 15, wherein the classification yard includes a plurality of monitoring assemblies, each monitoring assembly including a computer system configured for wireless communication with at least one other computer system of another monitoring assembly.

18. The yard of claim 17, further comprising a central system for managing operations of the rail vehicles on the plurality of classification tracks, wherein at least one computer system of the plurality of monitoring assemblies is configured to communicate with the central system.

19. The yard of claim 15, wherein the monitoring assembly is mounted at a location providing a head-on oriented view with respect to the plurality of classification tracks in the foul regions and at a height sufficient to prevent a line of sight of the set of cameras from being blocked due to normal operations in the classification yard.

20. The yard of claim 15, wherein the set of cameras includes a near infrared camera.

21. The yard of claim 15, further comprising a set of local alert components, wherein the method further includes activating at least one of the set of local alert components in response to determining the presence of an alert condition.

* * * * *